United States Patent [19]
Advenier et al.

[11] Patent Number: 5,087,016
[45] Date of Patent: Feb. 11, 1992

[54] ELECTROMAGNETIC VALVE IN PARTICULAR FOR INJECTION PUMP

[75] Inventors: Pierre Advenier, Paris; Marcel Regneault, Sartrouville, both of France

[73] Assignee: Automobiles Peugot et al., France

[21] Appl. No.: 610,396

[22] Filed: Nov. 7, 1990

[30] Foreign Application Priority Data

Nov. 7, 1989 [FR] France ............................ 8914594

[51] Int. Cl.[5] .......................................... F16K 31/06
[52] U.S. Cl. ............................. 251/129.15; 251/129.19
[58] Field of Search ................... 251/129.15, 129.14, 251/129.19; 137/901

[56] References Cited

U.S. PATENT DOCUMENTS

| | | | |
|---|---|---|---|
| 2,887,125 | 5/1959 | Lucien | 251/129.14 X |
| 3,355,145 | 11/1967 | De Coye | 251/129.14 |
| 3,878,859 | 4/1975 | Grob et al. | |
| 4,597,558 | 7/1986 | Hafner et al. | 251/129.15 X |

FOREIGN PATENT DOCUMENTS

| | | | |
|---|---|---|---|
| 2223616 | 12/1974 | France. | |
| 334053 | 12/1958 | Switzerland | 251/129.14 |
| 88/06692 | 9/1988 | World Int. Prop. O. . | |

*Primary Examiner*—Arnold Rosenthal
*Attorney, Agent, or Firm*—Ostrolenk, Faber, Gerb & Soffen

[57] ABSTRACT

An electromagnetic valve comprising a body containing a coil for displacing a plunger core acting upon a single part comprising on the one hand a piece forming a valve member co-operating with an opening formed in a piece constituting a seat for the valve member and on the other hand a piece slidably mounted in guided relationship within the seat piece, said single part being separated from the plunger core and operable by the latter.

2 Claims, 1 Drawing Sheet

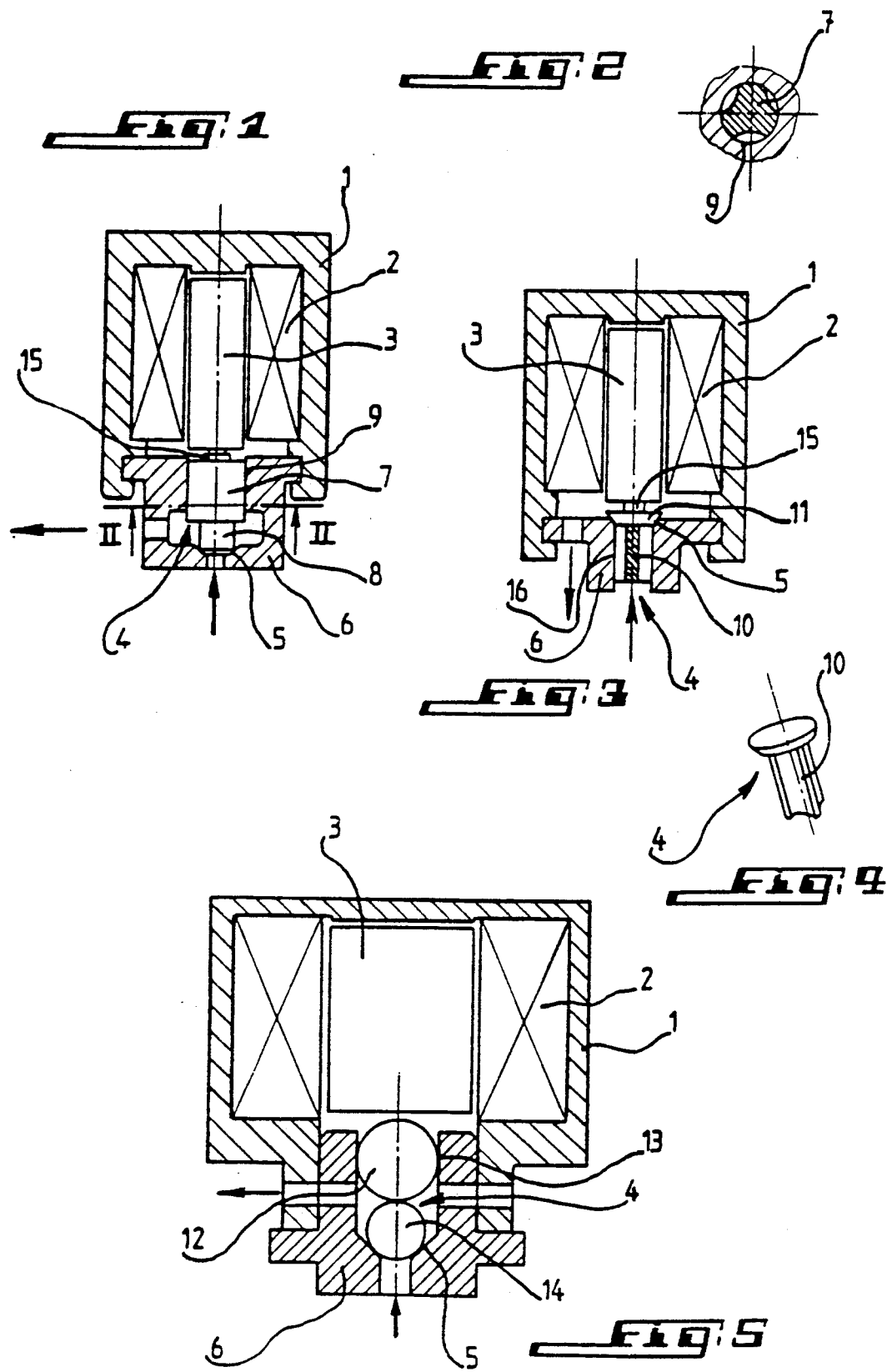

ELECTROMAGNETIC VALVE IN PARTICULAR FOR INJECTION PUMP

BACKGROUND OF THE INVENTION

The present invention relates to an improved electromagnetic valve, in particular for injection pumps in internal combustion engines.

There has already been proposed electromagnetic valves generally comprising a body or casing containing a coil or winding which upon being energized controls the displacement of a plunger core acting upon a valve member adapted to close an opening formed in a part constituting a seat for the valve member.

These electromagnetic valves, however, exhibited a number of inconveniences such, for instance, as the wear occurring in the course of time at the valve member with resulting defects in the fluid-tightness upon the closure of this valve member, especially when the latter consists of a ball which moves randomly in the seat of the valve member.

SUMMARY OF THE INVENTION

Therefore, an object of the present invention is to cope in particular with the above-mentioned inconveniences by providing an improved electromagnetic valve which is light in weight, the operation and response time of which are very quick and short, respectively, the electric current consumption of which remains moderate in view of the lightness of the moving parts and especially the life and fluid-tightness of which remain outstanding even after a long use.

For that purpose the subject of the invention is an improved electromagnetic valve comprising a body or casing housing a coil or winding which upon being energized controls the displacement of a plunger core acting upon a valve member adapted to close an opening formed in a piece constituting a seat for the valve member, characterized in that the valve member is made fast to a cylindrical or spherical part slidably mounted in guided relationship within the seat piece, the valve member-part assembly constituting a single piece separated from the plunger core and operable by the latter.

According to an examplary embodiment of this electromagnectic valve, the aforesaid part consists of a first cylindrical piece operable by the plunger core and the aforesaid valve member consists of a second cylindrical piece with a diameter differing from that of the first cylindrical piece.

This first cylindrical piece has a greater diameter than that of the second cylindrical piece forming the valve member proper.

According to another embodiment, the aforesaid part consists of a cylindrical element slidable within the seat piece below the aforesaid opening and topped by a frusto-conical piece forming the valve member and operable by the plunger core.

According to still another embodiment of the electromagnetic valve according to the invention, the aforesaid valve member and part consist of two balls, respectively, of different diameters.

The ball constituting the aforesaid part has a greater diameter than that of the ball forming the valve member.

According to still a further characterizing feature of this electromagnetic valve, the first aforesaid cylindrical piece or the aforesaid frusto-conical piece co-operates with the plunger core though the agency of a bearing stud.

It should further be specified that the aforesaid first cylindrical piece and the aforesaid cylindrical element exhibit in cross-section substantially the shape of a three-pointed star.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non limiting examples only illustrating several presently preferred specific embodiments of the invention and wherein:

FIG. 1 is a view in axial section of a first embodiment of the electromagnetic valve according to the invention;

FIG. 2 is a view in cross-section taken upon the line II—II of FIG. 1;

FIG. 3 is a view in axial section of a second embodiment of the electromagnetic valve according to this invention;

FIG. 4 is a perspective view of the valve member together with the guiding part fitting the embodiment of FIG. 3; and FIG. 5 is a view in axial section of another alternative embodiment of the electromagnetic valve according to this invention.

DETAILED DESCRIPTION

Referring to the Figures, it is seen that an improved electromagnetic valve according to this invention essentially comprises a body or casing 1 containing a coil or winding 2 which may be fed with electric current to operate a plunger core 3 acting upon a single part 4 separated from the plunger core 3 and forming a valve member adapted to close an opening 5 formed in a piece 6 made fast to the body 1 and constituting a seat for the valve member.

According to the embodiment shown on FIGS. 1 and 2 the single part 4 consists of a first cylindrical piece 7 operable by the plunger core 3 and of a second cylindrical piece 8 forming the valve member proper.

As shown in FIG. 1, the cylindrical piece 7 has a greater diameter than the cylindrical piece forming the valve member 8 and is tightly held in a bore 9 formed in the seat portion 6 so that it may be guided by sliding within the bore. Thus the second cylindrical piece 8 forming the valve member will always be accurately guided axially under the effect of a control from the plunger core 3 so that the phenomena of wear between the valve member 8 and the opening 5 will be advantageously avoided even in the course of time.

According to the embodiment shown in FIGS. 3 and 4 the single part 4 consists of a cylindrical element 10 slidably mounted in a seat portion 6 underneath the opening 5 and this within a bore 16 formed in the piece or portion 6.

This cylindrical element 10 is made fast to a frusto-conical piece 11 forming the valve member proper of the electromagnetic valve and which is operable by the plunger core 3.

Referring to FIG. 5 it is seen that according to still another embodiment, the single part 4 forming the valve member consists of two balls of differing diameters which are made fast to each other by any suitable means whatsoever, such as, for instance, by welding or adhesive bonding.

More specifically the single part 4 comprises an upper ball 12 tightly held and guided within a bore 13 in the seat portion 6. This ball 12 has a greater diameter than the second ball or lower ball 14 which forms the valve member proper adapted to close the opening 5. The assembly of both balls 12, 14 is separated from the plunger core 3 which may directly actuate the single part 4 by bearing upon the upper ball 12.

Reverting to FIGS. 1 and 3 it is seen that the cylindrical piece 7 (FIG. 1) and the frusto-conical piece 11 (FIG. 3) co-operate with the plunger core 3 through the medium of a bearing stud 15 which may assume a cylindrical or even spherical shape.

Referring more particularly to FIGS. 2 and 4 it is seen that the cylindrical piece 7 of the alternative embodiment shown in FIG. 1 as well as the cylindrical guiding element 10 of the alternative embodiment shown on FIG. 3 exhibit in cross-section substantially the shape of a three-pointed star.

Now it is quite possible without leaving the scope of the invention to use any other shape whatsoever which is adapted to allow the sliding and positive guiding of the cylindrical piece 7 or of the cylindrical element 10, i.e. at last of the valve member consisting of the cylindrical piece 8 (FIG. 1) or of the frusto-conical piece 11 (FIG. 3).

There has thus been provided according to the invention various embodiments of an electromagnetic valve comprising a single part separated from the plunger core and forming a valve member slidably mounted in positively guided relationship within a seat portion for the valve member so that the electromagnetic valve not only exhibits a reduced bulkiness and requires little electric current for its operation but also exhibits qualities of operating reliability and of service life definitely increased with respect to the prior art electromagnetic valves.

It should be understood that the invention is not at all limited to the embodiments described and shown which have been given by way of examples only.

On the contrary the invention comprises all the technical equivalents of the means described as well as their combinations if the latter are carried out according to its gist and within the scope of the appended claims.

What is claimed is:

1. An electromagnetic valve comprising:
   a body;
   an electric coil mounted in said body;
   a plunger core disposed within said coil and adapted to move slidably therein upon energization of said coil;
   a valve member body portion connected immovably to said body and comprising a seat portion and an orifice opening into said seat portion;
   a valve member mounted within said valve member body portion and comprising two balls having different diameters directly fastened to each other;
   said two balls comprising:
   a first ball of a first diameter which is slidably mounted in guided relationship within the valve member body portion and which is directly operated by said plunger core; and
   a second ball having a second diameter less than the first diameter adapted to bear upon said seat portion and to close said orifice in response to actuation of said first ball by the plunger core bearing upon said first ball.

2. The electromagnetic valve recited in claim 1 wherein said two balls are fastened to each other by welding or adhesive bonding.

* * * * *